United States Patent
Niemi

[19]

[11] Patent Number: 5,819,175
[45] Date of Patent: Oct. 6, 1998

[54] METHOD AND ASSEMBLY FOR ASSIGNING A FUNCTION OF AN ELECTRONIC DEVICE

[75] Inventor: Pekka Niemi, Salo, Finland

[73] Assignee: Nokia Mobile Phones Limited, Espoo, Finland

[21] Appl. No.: 341,671

[22] Filed: Nov. 17, 1994

[30] Foreign Application Priority Data

Nov. 24, 1993 [FI] Finland ..................................... 935226

[51] Int. Cl.⁶ ....................................................... H04Q 7/00
[52] U.S. Cl. ........................... 455/418; 455/575; 455/88; 455/186.1
[58] Field of Search ............................... 455/37.1, 66, 88, 455/89, 90, 186.1, 347, 351, 418, 419, 420, 422, 462, 550, 557, 569, 575, 100, 121; 379/58, 59, 62, 355, 357; 340/825.44; 364/514 R, 514 C

[56] References Cited

U.S. PATENT DOCUMENTS

| | | | |
|---|---|---|---|
| 5,152,003 | 9/1992 | Poch | 455/66 |
| 5,302,947 | 4/1994 | Fuller et al. | 340/825.44 |
| 5,325,418 | 6/1994 | McGregor et al. | 379/59 |
| 5,367,563 | 11/1994 | Sainton | 379/58 |
| 5,511,240 | 4/1996 | Nishiyama | 455/89 |

FOREIGN PATENT DOCUMENTS

| | | |
|---|---|---|
| 0266 678 A3 | 5/1988 | European Pat. Off. . |
| 0360725 | 3/1990 | European Pat. Off. . |
| 0423 733 A3 | 4/1991 | European Pat. Off. . |
| 0524652 | 1/1993 | European Pat. Off. . |
| 9215403 | 12/1992 | Germany . |
| 4210409 | 8/1993 | Germany . |
| 3-219795 | 9/1991 | Japan ....................................... 359/58 |
| WO 94/10786 | 5/1994 | WIPO . |

*Primary Examiner*—Thanh Cong Le
*Attorney, Agent, or Firm*—Perman & Green, LLP

[57] ABSTRACT

The present invention relates to a method and an arrangement for determining the function of a press-button switch. A press-button switch (3; 31,32, . . . , 3N) has been arranged in a peripheral (2) connected detachably to a mobile-phone (1). According to the method, a press-button switch (e.g. 31) is pressed when the mobile phone (1) and the peripheral (2) are electrically coupled. Thereafter, the detection data of said pressed press-button switch (31) are transmitted from the peripheral (2) to the mobile phone (1), to the data processing unit (13) thereof. The function of the pressed press-button switch (31) is determined with the aid of the key pad (7), the data processing unit (13) of the mobile phone (1), and the data and the instructions stored in the memory unit (15) thereof. The function of the press-button switch of the peripheral thus determined is stored in the memory unit (15) of the mobile phone (1), whereafter the press-button switch is available for use.

7 Claims, 3 Drawing Sheets

5,819,175

METHOD AND ASSEMBLY FOR ASSIGNING A FUNCTION OF AN ELECTRONIC DEVICE

FIELD OF INVENTION

The present invention relates to radio telephone apparatus and a method therefor, in particular to an apparatus and method for assigning to keys of a peripheral device respective functions corresponding to functions of a radio telephone removably coupled thereto.

BACKGROUND TO INVENTION

In recent years there has been a proliferation of different types of radio telephone network. Some networks being cellular, others cordless, whilst some are analogue systems and others digital systems. Examples of such systems being the JDC, GSM, PCN, DAMPS, NMT AND TACS networks. The design of a radio telephone varies dependent upon the network for which it is intended to be used. Each radio telephone for respective networks, may have different configurations, software and circuitry for implementing the various functions assigned to the keys normally disposed on the radio telephone as part of the user interface provided. Consequently, when the radio telephone is mounted in a peripheral device such as a charger, desk stand or in-car holder, that peripheral must have its keypad designed to operate with the particular type of radio telephone. Typically, the functions which it is desired to be available from the keypad of a peripheral are, for example muting (MUTE) of the microphone, enquiry call, unloading of a phone message, transfer of the call, an emergency call, etc. The peripheral can be provided with expanded auxiliary and/or call functions.

Heretofore, it has been necessary to provide such peripheral devices which are adapted for use with radio telephones for one, or a limited number of like, radio telephone systems. This has meant that a large number of different peripherals for each type radio telephone have had to be provided. This increases manufacturing costs, storage costs and requires greater shelf space of the point of sale on which to display the various peripherals. Additionally, there has been the risk that customers might be confused and inadvertently purchase the wrong peripheral for their radio telephone.

Also, it is known in the computer art, to have a keyboard with keys whose function is determined by software running on the computer to which the keyboard is attached. These keys are commonly known as "soft keys", and the software could be menu driven. Thus, the user of the computer is able to select among a plurality of optional functions those that are desired to be used as the function of a given key.

BRIEF SUMMARY OF INVENTION

In a first aspect of the invention there is provided a method for assigning a function of a first electronic (1) apparatus to a switch means (31, 32 . . . 3N) disposed on a second electronic apparatus (2) detachably coupled to the first electronic apparatus (1), comprising:
  activating the switch means (31, 32 . . . 3N;
  detecting in the first electronic apparatus (1) the identity of the activated switch means (31, 32 . . . 3N);
  selecting a function from the first electronic apparatus (1) and
  storing the selected function in correspondence with identity of the activated switch means (31, 32 . . . 3N) such that the selected function is executed when switch means (31, 32 . . . 3N) is activated.

and in a second aspect of the invention there is provided an assembly for assigning a function of first electronic apparatus (1) to a switch means (31,32 . . . 3N) disposed on a second electronic apparatus (2), comprising the first electronic apparatus (1) removably coupled to a second electronic apparatus (2) wherein the second electronic apparatus (2) includes switch detection means for determining detection data corresponding to activation of the switch means (31,32 . . . 3N), and means for transferring the detection data to the first electronic apparatus (1), and the first electronic apparatus (1) includes means for receiving the detection data and means for determining the function of the switch means (31, 32 . . . 3N) in accordance with a function selected from functions available from the first electronic apparatus (1).

This has the advantage that common accessories, such as desk stands, chargers or in-car hands free holder can be produced for use with different types of radio telephones. This is less confusing for a consumer, and simplifies manufacturing, delivery and supply thereby reducing costs.

BRIEF DESCRIPTION OF THE DRAWINGS

The invention is described in detail below, reference being made to the accompanying drawings, in which FIG. 1 demonstrates a mobile phone and a peripheral connected together.

DETAILED DESCRIPTION OF EMBODIMENTS OF THE INVENTION

Figure 1:
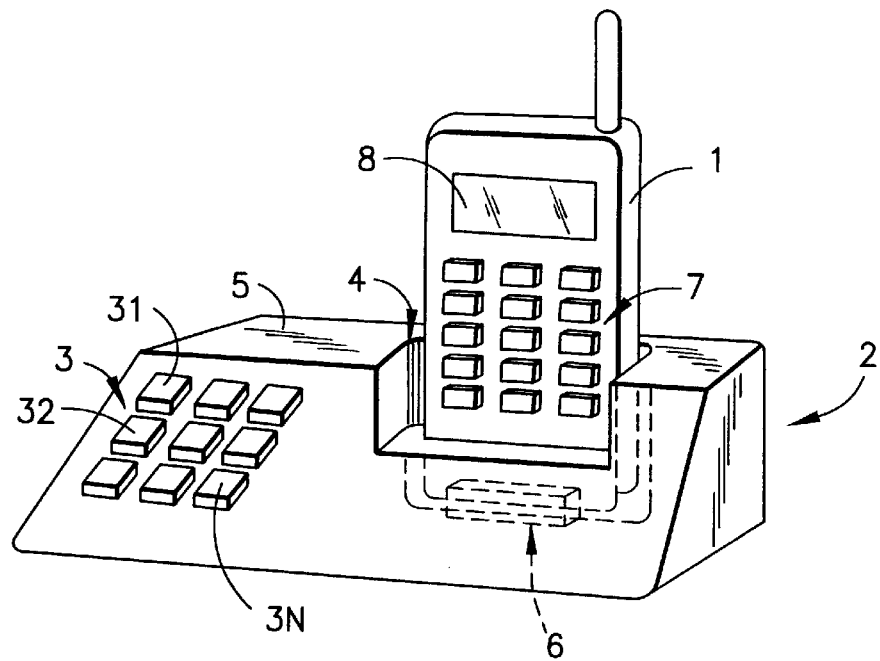

FIG. 1 shows a combination of a mobile phone 1 and a peripheral 2 removably coupled together. The peripheral 2 comprises a keypad consisting of a plurality of press-button keys 3, and an adaption recess 4 or an equivalent location for the mobile phone 1. The press-button keys 3 and the adaption recess 4 are arranged in the housing 5 of the peripheral. The mobile phone 1 is detachably inserted in the adaption recess 4 of the peripheral such that abutting parts of a connector 6 respectively disposed on apparatus 1 and 2 are connected to one another, thereby electrically coupling the mobile phone 1 and the peripheral 2. The mobile phone 1 comprises a function or user interface, comprising the keypad 7, and display, such as liquid crystal display 8 for displaying the functions and the states of the phone.

Figure 2:
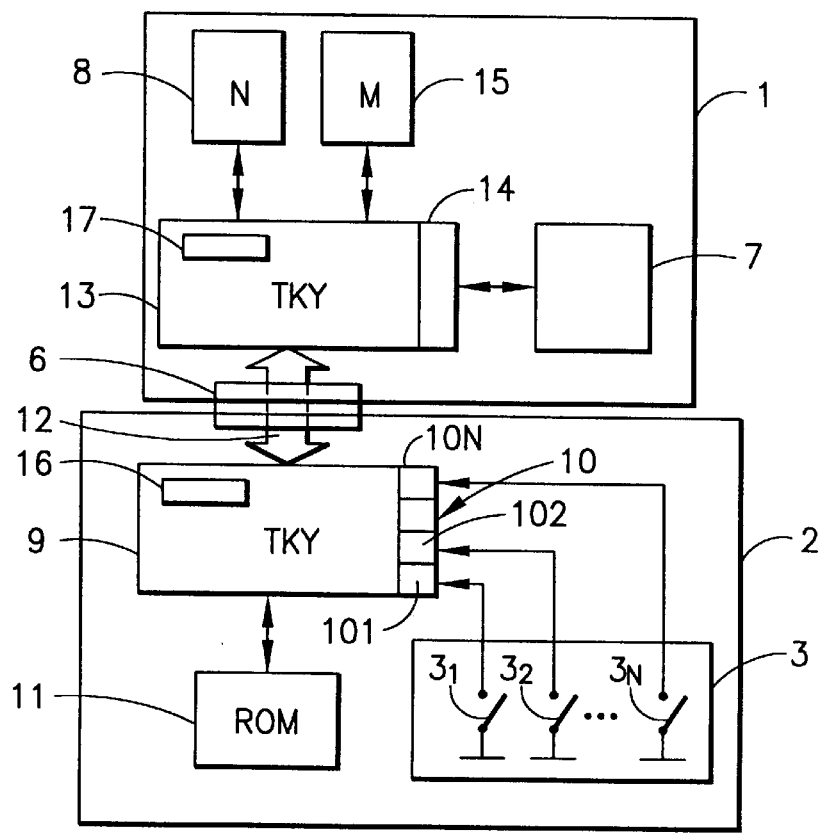
FIG. 2 shows a block diagram of the key functions of the mobile phone and the peripheral.

The circuitry related to the press-button keys 3 of the peripheral 2 are shown in FIG. 2. The press-button keys 3 include an array of separate press-button keys 31,32, . . . , 3N (N=integer). The press-button keys 3 are preferably reversible on/off switches. The press-button keys are connected to the data processing unit 9 of the peripheral, such as a microprocessor, via an input/output terminal 10. Each press-button key 31,32, . . . ,3N is provided with an individual input/output terminal 101,102, . . . , 10N. In conjunction with the data processing unit 9 there is provided at least one memory unit 11, such as a ROM memory unit. The memory 11 stores detection data relating to the press-button keys 3, such as the ordinals thereof or their positions of the keys. The data processing unit 9 is connected to a data bus 12, and further, via a connector 6, to the mobile phone 1.

The mobile phone 1 comprises a data processing unit 13, such as a microprocessor, to which is connected a keyboard 7 via input/output terminals 14, as can be seen in FIG. 2. Associated with the data processing unit 13 is at least one memory unit 15. A display 8 is also connected to the data processing unit 13. The data processing unit 13 is connected to the data processing unit 9 of the peripheral 2 via the data bus 12 and the connector 6 when the peripheral 2 and the mobile phone 1 are removably coupled together.

The mobile phone 1 and the peripheral 2 are electrically connected together when the mobile phone 1 is disposed in the adaption recess 4 of the peripheral such that the parts of the connector 6 disposed on respective apparatus are joined together. Now, the data processing unit 13 of the mobile phone 1 and the data processing unit 9 of the peripheral 2 are connected to each other by the aid of a data bus 12. The coupling of the mobile phone 1 and the peripheral 2 and particularly the implementation of the data bus 12 are detected with appropriate detection devices 16, preferably positioned in conjunction with the data processing unit 9 of the peripheral 2. The decoupling and removable of the mobile phone 1 from the peripheral 2 can also be detected with the aid of the detection devices 16.

The functions of one or more press-button keys 31, 32, ..., 3N of the peripheral 2 are assigned as follows. After the mobile phone 1 and the peripheral 2 have been connected, and the electrical coupling and the opening of the data bus 12 have been detected by the peripheral to have taken place, e.g. with a first detection means 16, the mobile phone 1 detects the peripheral 2, e.g. with a second detection means 17. When one press-button key of the peripheral 2, such as 31, is pressed, it is detected in the data processing unit 9, and the detection data of the press-button key 31, preferably the number of the press-button key and data on switching-off of the switch of said press-button key, are transferred from the data processing unit 9 of the peripheral 2 along the data bus 12 to the data processing unit 13 of the mobile phone 1. Thus, the data processing unit 13 of the mobile phone 1 has information relating to key 31 enabling it to identify further presses of that key. The user interface of the mobile phone 1 can now be utilised to assign to key 31 a function which is normally available on the mobile phone 1. A menu option for the mobile phone 1 can be selected which permits a user to assign a particular function to key 31. On activating such an option, the user is prompted to perform the key stroke sequence on the mobile phone key pad 7 which normally results in the function which it is desired to assign to key 31. The data processing unit 13 recognises the key stroke sequence or function associated with that key stroke sequence, and stores that sequence of function in memory 15 in correspondence with the detection data of key 31. After assigning the function of the press-button switch 31 in such a manner, further presses of key 31 will result in that function being performed. Alternatively, the function could be selected by scrolling through a menu of functions available on the mobile phone 1, and storing a selected function in memory 15 in correspondence with the detection data for key 31. For example, in the memory 15 of FIG. 2 there can be a fixed function (F11 ... FNM) for each key (31 ... 3N) for each peripheral (1 ... M). Alternatively the user can choose from the menu one option (1 ... L) which is designed as to be the function of a certain key when using a certain peripheral. That function is used until it is changed.

Of course functions can be same for all peripherals too. Functions can also vary depending on telephone type or system.

Figure 3:
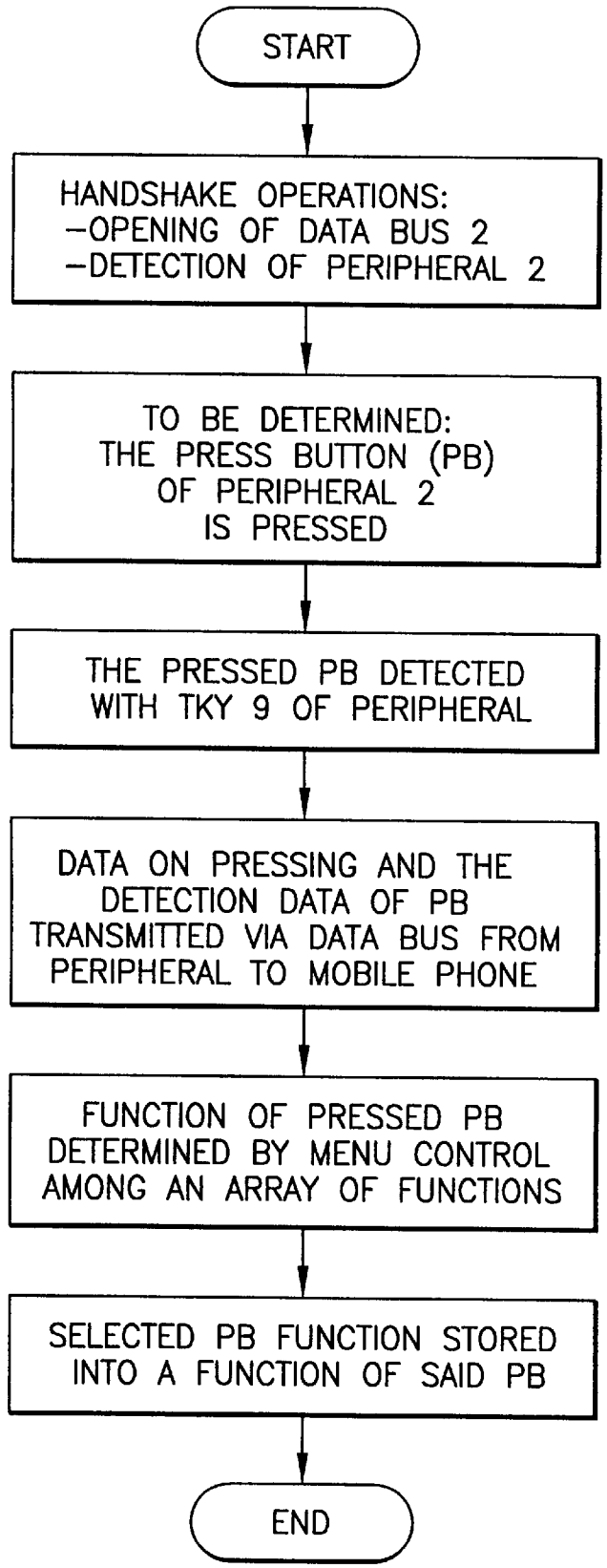
FIG. 3 shows a block diagram for determining the function of a key of a peripheral.

The steps in assigning of a function to the press-button key as before described is shown in the flow chart of FIG. 3.

The same procedure is followed for all the keys of the peripheral to which it is desired to assign a function.

The functions assigned to the press-button keys 3 of the peripheral 2 are maintained in the memory 15 of the mobile phone 1 when the mobile phone 1 is released from the peripheral 2. Thus the same mobile phone can be used in the same peripheral without any need for further programming of the keys. Detaching the apparatus from one another is detected with the aid of the above-mentioned detection means 16.

The detection data of the press-button switch 31, 32, ... ,3N usually means the switching off of the press-button switch, i.e. start of the pressing, and switching on the press-button switch, i.e. termination of the pressing, and the data related to detection of the press-button switch, or data on the location thereof among the other press-button switches of the peripheral, such as ordinal number.

It is advantageous to store data on the type of peripherals 2 connectable to a mobile phone 1 into detection means 17, disposed in the mobile phone 1. When a mobile phone 1 and a peripheral are coupled together, or immediately thereafter, the data processing unit 9 of the peripheral 2 transmits from the memory unit 11 thereof its peripheral detection data along the data bus 12 to the data processing unit 13 of the mobile phone 1. The data processing unit 13 activates the second detection means 17 which compares the peripheral detection data with the contents of a peripheral detection file stored in the memory of the detection means 17, and thereby detects and identifies the type of peripheral 2. After detecting the peripheral 2, the data on the properties thereof are stored e.g. in the memory unit 15, and are available for use by the data processing unit 13 of the mobile phone 1. The above procedure can be included in the electrical handshake operations following after the connection of the mobile phone 1 and the peripheral 2, in which the opening of the data bus 12 through the connector 6 is also detected.

Alternatively, no individual data on a variety of peripherals is stored in the memory unit 15 of the mobile phone 1, but merely the information that peripherals can be connected to the mobile phone 1 and that the functions of the press-button keys thereof can be determined with the aid of the keyboard of the mobile phone 1. Hereby, data on a peripheral 2 has been stored in the memory unit 11 of the peripheral 2, and particularly the detection data of one or more press button keys 31,32, ... , 3N thereof. Said data on the peripheral 2 is transferred by means of the data processing unit 9 of the peripheral along the data bus 12 to the data processing unit 13 of the mobile phone 1 and stored in the memory unit 15 thereof after the mobile phone 1 and the peripheral 2 have been connected.

The above procedure for determining the function of the press-button keys is preferably implemented by way of an appropriately programmed microprocessor or apparatus which is at least partly programmable, and instructions for which have been stored in the memory units 11,15 associated with the data processing units 9,13 of the peripheral 2 and the mobile phone 1. The detection means 16,17 may also be implemented as programmed handshake operations, implemented most preferably from the mobile phone 1, and particularly from the data processing unit 13 thereof.

Figure 4:
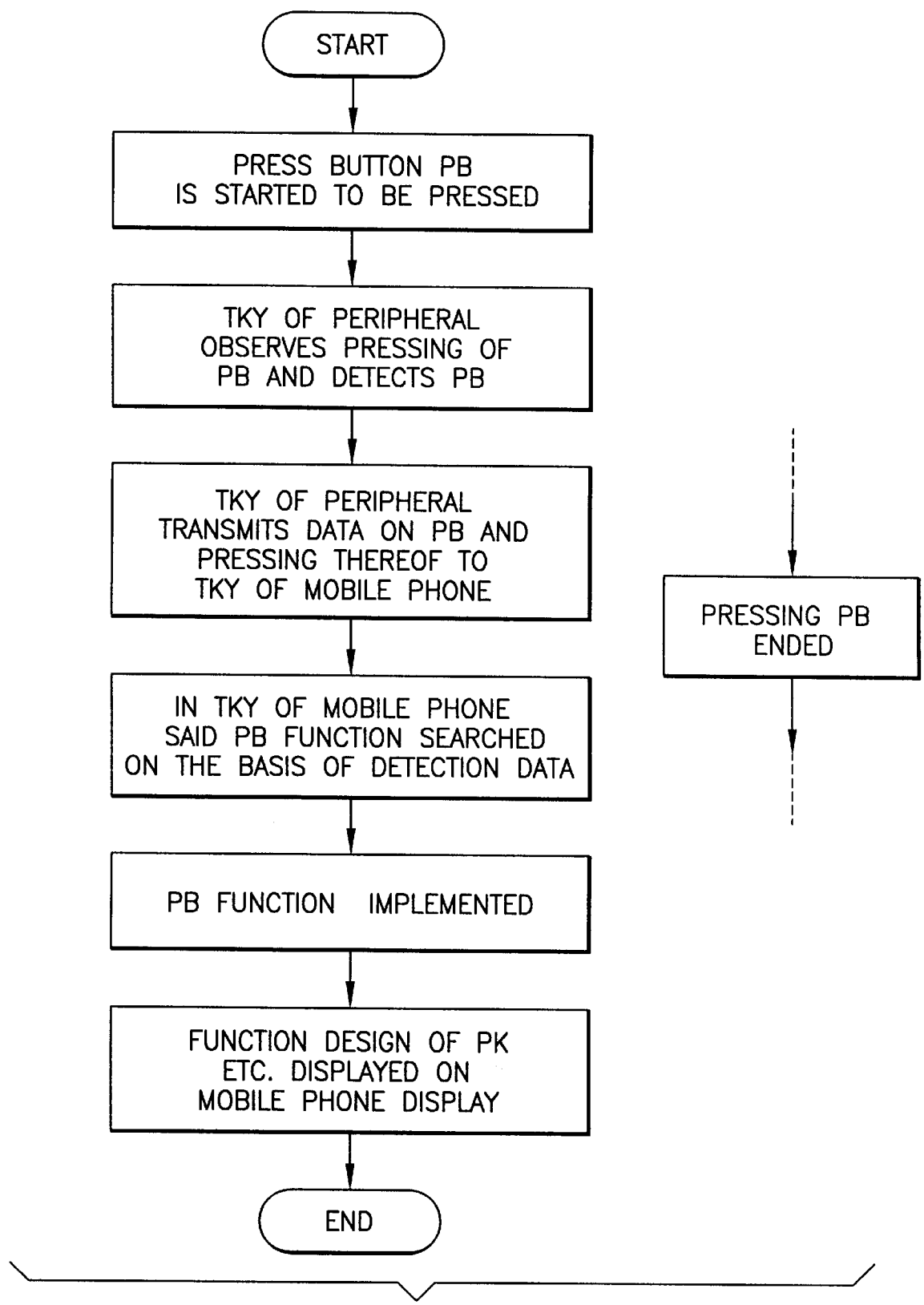
FIG. 4 shows a block diagram of the use of a key of a peripheral.

After one or more press-button keys 3 of the peripheral 2 have had functions assigned to them, it is used as follows. When an assigned or programmed press-button key, such as 31, is pressed to be in the down-position, the electrical coupling in the key is executed and the data processing unit 9 of the peripheral 2 receives a message that the press-button switch 31 is being pressed and of the execution of the electrical coupling through the input/output interface terminal 101 in question, thus detecting the press-button key. The detection data of the press-button key 31 pressed, such as the number thereof, and a message that the press-button key has been pressed is transmitted further via the data bus 12 to the data processing unit 13 of the mobile phone 1. The function of the press-button key 31 of said peripheral 2 has been stored in memory unit 15 and is now accessed from the memory unit 15 on the basis of the detection data of the press-button key sent to the data processing unit 13. The user is informed of the function to be implemented e.g. in the display 8 of the mobile phone 1, together with which said function is performed. When the press-button switch 31 is released, it returns to the upper position, thus terminating the electrical coupling, which is detected and the data processing unit 13 of the mobile phone is informed thereof via the data bus 12 from the data processing unit 9 of the peripheral 2. No additional measures result from this action. The functioning of the press-button key of a determined peripheral when in use is shown in the flow chart of FIG. 4. Upon completion of the function, a subsequent press-button key can be pressed and a new function performed.

Transmission of messages via the data bus 12 from the data processing unit 9 of the peripheral 2 to the data processing unit 13 of the mobile phone 1 is embodied as a digital package connected data transfer. Within a given frame, a data package includes a data field in which detection data of a press-button switch and data on starting (and terminating) to press a press-button switch are accommodated when the press-button switch is being pressed.

Two press-button switches, such as 31,32, or even more can be pressed simultaneously, whereby data on starting to press the switches is transmitted from the peripheral 2 to the mobile phone 1 in principle in the same way as pressing one press-button switch, as described above. For the pressing of a number of press-button switches an individual function can be determined using the same procedure as for one press-button switch.

In view of the foregoing description it will be evident to a person skilled in the art that various modifications may be made within the scope of the invention. For example, the function of the switch corresponding to a function of the mobile phone (1) may be stored in the peripheral (2), such that all or some of the special programmed features of the switches on the peripheral (2) are stored in the peripheral (2).

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What I claim is:

1. A method for assigning a function of a first electronic apparatus to a switch means disposed on a second electronic apparatus detachably coupled to the first electronic apparatus, comprising:

activating the switch means by pressing a push button key a single time;

detecting in the first electronic apparatus the identity of the activated switch means;

selecting a function from the first electronic apparatus; and storing the selected function in correspondence with the identity of the activated switch wherein, when the switch means is activated again by pressing the push button key again a single time, with the first apparatus coupled to the second apparatus, the first apparatus performs the stored function corresponding to the activated switch means, wherein only the push button key in the second electronic apparatus needs to be pressed without pressing any other key in the second electronic apparatus for storing the selected function and performing the stored function.

2. A method according to claim 1, wherein the function is selected from a menu available on the first electronic apparatus.

3. An assembly for assigning a function of a radio telephone to a switch means disposed on a radio telephone peripheral, the assembly comprising:

the radio telephone peripheral including detection means having first identification data which identifies the radio telephone peripheral;

first detection means in the radio telephone peripheral for determining detection data corresponding to activation of the switch means;

means for transferring the detection data and the first identification data to the radio telephone;

second detection means, located in the radio telephone, having second identification data stored therein; and comparing means, located in the radio telephone, for comparing the first identification data with the second identification data and identifying correlation therebetween, wherein the second detection means further comprises switch means function data corresponding to the second identification data, and storage means for storing corresponding switch means function data of second identification data correlating with the first identification data such that activation of the switch means facilitates a function defined by the switch means function data stored in the storing means.

4. An assembly according to claim 3, wherein data identifying the radio telephone peripheral is stored in the radio telephone, said data being utilised to detect the radio telephone peripheral when the radio telephone and the peripheral are coupled together.

5. An assembly according to claim 3, wherein a data processing unit and a memory unit are included in the radio telephone peripheral, in which memory unit data corresponding to the radio telephone peripheral and the detection data of the switch of the radio telephone peripheral are stored, and which data is transmitted to the radio telephone, said peripheral being detected when the radio telephone and the radio telephone peripheral are coupled electrically.

6. Arrangement according to claim 3, wherein the data processing unit of the radio telephone and the data processing unit of the peripheral are coupled via a data bus when the radio telephone and the peripheral are coupled together.

7. An assembly according to claim 3, wherein switch means is a reversible on/off switch coupled to the data processing unit of the radio telephone.

* * * * *